Oct. 12, 1926.

J. J. AURYNGER 1,603,184

CONDENSER

Filed August 16, 1922

WITNESSES:

John J. Aurynger
INVENTOR.

Patented Oct. 12, 1926.

1,603,184

UNITED STATES PATENT OFFICE.

JOHN J. AUBYNGER, OF BROOKLYN, NEW YORK.

CONDENSER.

Application filed August 16, 1922. Serial No. 582,130.

The object of this invention is to make a radio condenser which will eliminate all irregularities in condensers which are used in wireless telegraphy and telephony.

The invention is related to the induction of coils of insulated wire where the wave length is determined by the length of wire in the coil.

This invention consists of two elements containing one or more metal plates separated by a dielectric but differs from other condensers in that the plates are perforated or made up in the shape of grids.

A description of what electrostatic consists may be found in Timbie's "Elements of Electricity". From page 305 to 307 inclusive emphasis is placed upon the dielectric. Condensers have capacity in common with storage batteries, coils and the like which do not contain a dielectric. Condensers differ from other capacities in that the dielectric permits oscillations of electric energy.

The discussion about capacities which are common in condensers, storage batteries, coils and the like is summed up by Timbie on page 320 of his book which is as follows:

"Bound charges. The two kinds of electricity, positive and negative attract each other, like two unlike magnetic poles. Two oppositely charged plates near each other have a greater capacity on account of this attraction than when widely separated. The charges are then said to be bound."

The equation for capacity C of condenser $$C = \frac{855KA}{10^{10}d}.$$

The value of K in the equation depends upon the material of the dielectric and is called its dielectric power. It represents the power of the dielectric, as compared with air, to convey the binding effect of one charge on the other.

The aerial is considered a distributed capacity, therefore, a perforated plate condenser which has distributed capacity may be used as an aerial. The resistance of the insulating compound with which the perforations are filled to form a grid by painting the plates or otherwise, is greater than the resistance of a solid plate condenser which has only air for a dielectric between plates.

The grid is made from a plate of nonmagnetic metal with the interstices filled with an insulating material which will prevent sparking when high potentials are used. The same effects will be produced when the interstices are filled with nonmagnetic flake metal and compressed. The dielectric strength of the insulating compound on the grid made by filling the perforations of the plate is greater than the dielectric constant of air. In the above formula for finding the capacity of a condenser the capacity of the perforated plate condenser will be approximately the same as a solid plate condenser.

Figure 1:
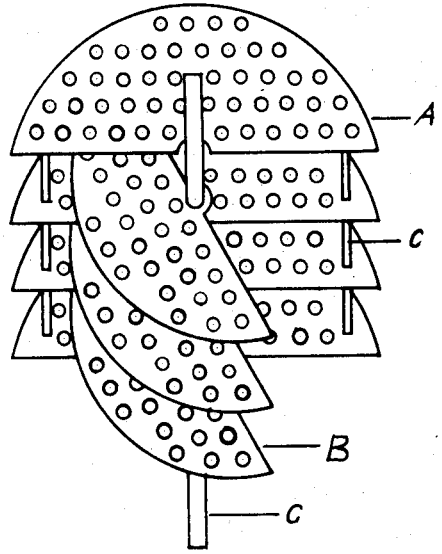
Figure 2:
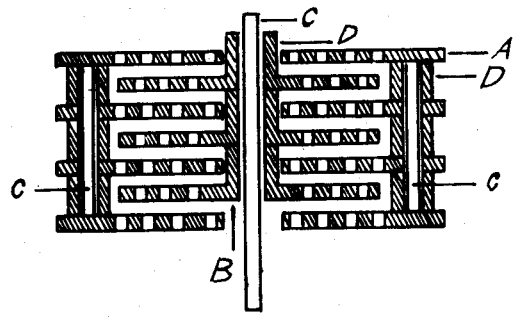
Figure 3:
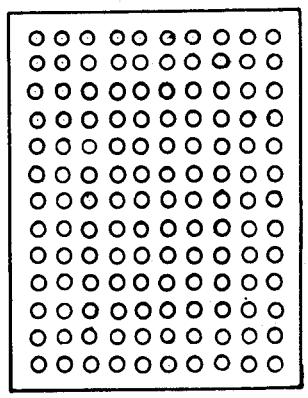
Figure 4:

Fig. 1 shows a variable condenser having two or more broad surfaces of metal separated by a dielectric with projections on the plates which form a sheathing around the bolts. Fig. 2 is a cross section view of same. Figs. 3 and 4 are modifications showing a plurality of perforations which are not limited to size or number. The perforations make clean holes without burrs, the vents being the same on both sides of the plates.

Referring to the accompanying drawing, Fig. 1 represents a variable condenser. A and B are two semicircular elements. They consist of perforated nonmagnetic metal plates as aluminum fastened together with an intervening space by bolts C. The element A is stationary and the element B rotates around C. The plates of B interleave between the plates of A but never touch A.

Fig. 2 is a cross section of the same. D is a flange on the plates through which the bolts C pass. The flanges act as a spacer between the plates and connect the plates of each element electrically. The sides of the flange, "D", as shown in the drawing are straight and vertical.

The flanges, D, are obtained in this way. The metal plates are embossed on one side by raising in relief the parts where the holes are to be punched. The holes are punched through the top of the embossing leaving the sides as flanges.

Fig. 3 shows one form of grid for all condensers. Fig. 4 is its cross section. S represents an interstice filled with both an insulating material as mica or rubber compounds and compressed flake metal as the case may be. E is a grid of nonmagnetic metal as aluminum.

A diffraction grating consists of a condenser plate which has been perforated with holes or has slices of metal removed into which spaces in the metal insulating material has been injected in order to make a solid plate. The holes and slices may be of various shapes and sizes, or expanded metal may be used.

The benefits obtained with this invention are more even electrical impulses and a modulator of electric oscillations by electromagnetic force.

I claim:

1. A condenser element for transmitting electrical oscillations through a dielectric, comprising spaced plates of homogeneous metal having a plurality of perforations, having equal electric density throughout with a distributed unit area of plate capacity.

2. A condenser element for transmitting electrical oscillations through a dielectric, comprising a plurality of spaced plates of homogeneous metal consisting of a plurality of vents in said plates, said vents forming a perforation on both sides of said plates.

3. In an electrical condenser for transmitting electrical oscillations through a dielectric, a plurality of substantially parallel spaced plates of homogeneous metal in assembled relation, said plates joined in positive and negative series and insulated from each other, said series singly and combined consisting of vented plates having a plurality of perforations on both sides of said plates.

JOHN J. AURYNGER.